United States Patent [19]

Atkins

[11] Patent Number: 4,603,612
[45] Date of Patent: Aug. 5, 1986

[54] SAFETY ATTACHMENT FOR A TABLE SAW

[76] Inventor: Richard R. Atkins, 730 N. Lyford Rd., Rockford, Ill. 61107

[21] Appl. No.: 682,085

[22] Filed: Dec. 17, 1984

[51] Int. Cl.⁴ ............................................. B27B 25/10
[52] U.S. Cl. ....................................... 83/425; 83/437; 83/438; 83/435.1; 83/477.2; 269/315
[58] Field of Search .................. 83/437, 435.1, 431, 83/477.2, 438, 418, 421, 425; 269/91, 315

[56] References Cited

U.S. PATENT DOCUMENTS

| | | | |
|---|---|---|---|
| 2,410,467 | 11/1946 | Valentine | 83/437 |
| 2,522,965 | 9/1950 | Schaufelberger | 83/435.1 X |
| 2,985,202 | 5/1961 | Wilson | 83/431 |
| 3,994,484 | 11/1976 | Schorr | 269/315 |
| 4,026,173 | 5/1977 | Livick | 83/421 |
| 4,399,728 | 8/1983 | Davis | 83/418 |
| 4,469,318 | 9/1984 | Slavic | 269/91 |
| 4,485,711 | 12/1984 | Schnell | 83/477.2 |

Primary Examiner—Donald R. Schran
Attorney, Agent, or Firm—Leydig, Voit & Mayer Ltd.

[57] ABSTRACT

The attachment includes a body which rests on the rip rail of the saw and which is guided slidably along the rail by two depending legs and by two pivoted arms. The leading end of one of the legs engages the trailing end of the board to push the board into and past the saw blade while the lower end of one of the arms presses the board downwardly against the table to prevent the board from flying upwardly. The hold-down arm is spring-biased into pressing engagement with the board and may swing upwardly and downwardly to accommodate boards of different thicknesses.

9 Claims, 5 Drawing Figures

SAFETY ATTACHMENT FOR A TABLE SAW

BACKGROUND OF THE INVENTION

This invention relates generally to a safety attachment for a table saw having a conventional table, a rotatable cutting blade and a rip rail. More particularly, the invention relates to an attachment which coacts with the rip rail to enable a relatively short and narrow board to be pushed into and past the blade while reducing the risk of the operator's hand and fingers being cut and while also reducing the risk of the board flying upwardly from the table and striking the operator.

An attachment of this general type is disclosed in Livick U.S. Pat. No. 4,026,173. The Livick attachment, however, is relatively complex in construction, is difficult to install and remove from the table saw, and requires time-consuming adjustments to accommodate boards of different thicknesses.

SUMMARY OF THE INVENTION

The general aim of the present invention is to provide a new and improved safety attachment of the above general type which is extremely simple in construction, which may be simply placed on and lifted off of the table saw and which automatically accommodates boards of different thicknesses without need of any manual adjustments whatsoever.

A more detailed object is to achieve the foregoing by providing a safety attachment having a body adapted to be pushed along the rip rail, having a depending leg for engaging the trailing end of the board to push the board into and past the saw blade, and having a spring-loaded, pivoted arm for positively pressing the board downwardly against the table regardless of the thickness of the board.

The invention also resides in the novel provision of a safety attachment in which the leg and the arm uniquely coact with a second leg and a second arm, respectively, to guide and stabilize the attachment on the rip rail during pushing of the attachment to feed the board into the cutting blade, the pairs of legs and arms also enabling both left and right hand operation of the attachment.

These and other objects and advantages of the invention will become more apparent from the following detailed description when taken in conjunction with the accompanying drawings.

DETAILED DESCRIPTION OF THE PREFERRED EMBODIMENT

Figure 1:
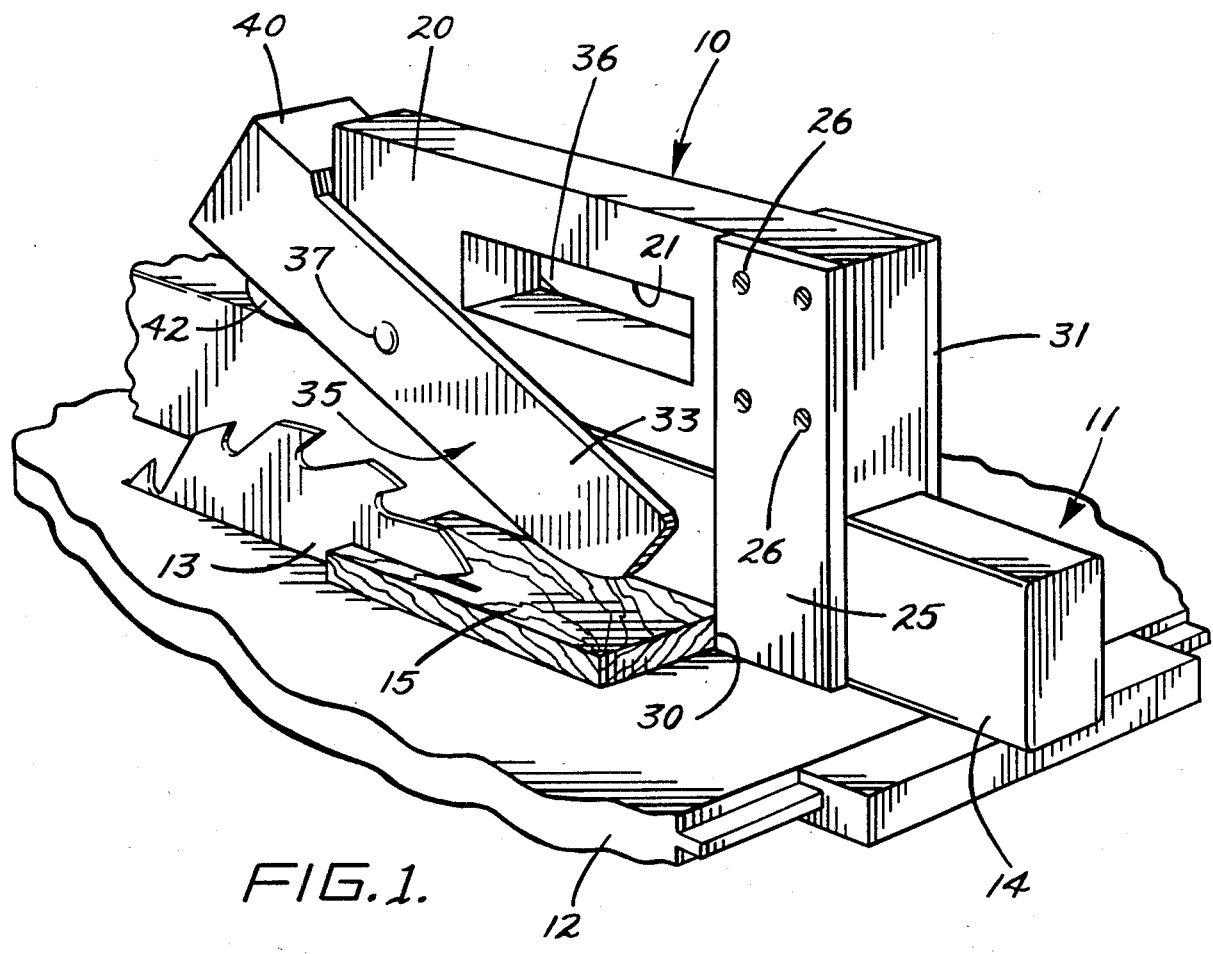
FIG. 1 is a fragmentary perspective view of a typical table saw equipped with a new and improved safety attachment incorporating the unique features of the present invention.

For purposes of illustration, the safety attachment 10 of the invention is shown in the drawings in conjunction with a conventional table saw 11 having the usual horizontal work table 12. A rotatable rip blade 13 extends upwardly through the table and is spaced laterally from a rip rail 14 upstanding from the table. The rip rail may be selectively adjusted laterally toward and away from the blade to establish the width cut from a board 15 or other piece of stock as the board is guided along the rail and is pushed into and past the blade.

It is well-recognized that it is dangerous for the operator to push a relatively short and narrow board 15 into and past the blade 13. Not only are the operator's fingers in danger of being cut but, in addition, there is significant risk that the blade might cause the board to fly upwardly and strike the operator.

The safety attachment 10 of the present invention reduces the aforementioned risks while being relatively low in cost and simple and easy to use. The present attachment is particularly characterized by its ability to automatically handle boards of different thicknesses and by the ease with which the attachment may be installed on and removed from the table saw 11.

Figure 3:
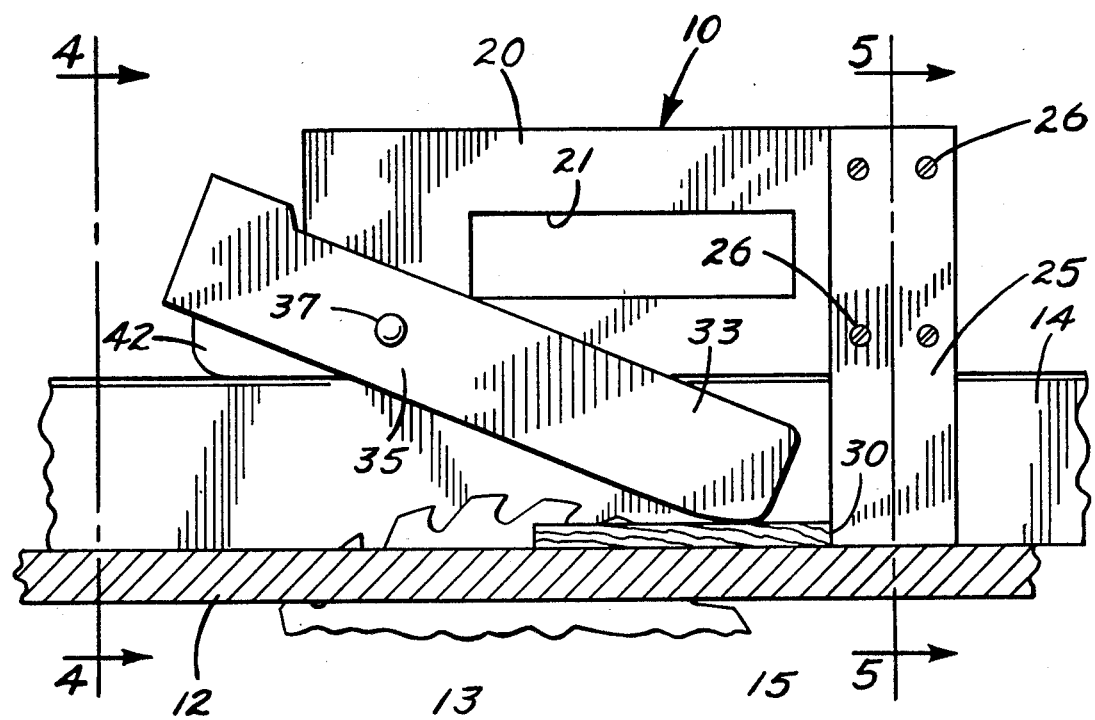
FIG. 3 is a side elevational view, partly in section, of the table saw and attachment shown in FIG. 1.
Figure 5:
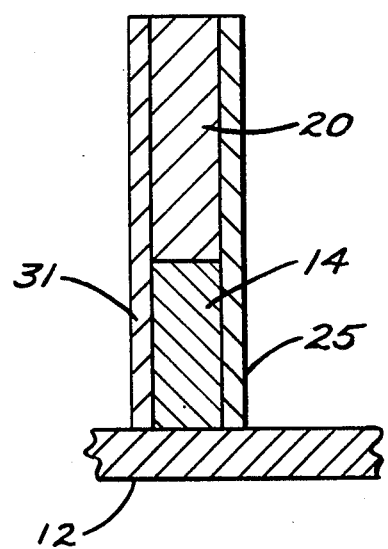

More specifically, the attachment 10 includes a main body 20 which herein is simply a block-like member made of wood or the like. While the body has been shown as being one piece, it may be fabricated from several pieces. The body is about the same width as the rip rail 14 and its flat lower surface rests square against the upper surface of the rail as shown in FIGS. 3 and 5. To facilitate pushing the attachment along the rail, a laterally extending hand hole 21 is formed through the central portion of the body. The operator may place the fingers of his right hand through the hole 21 and thereby may obtain a firm grip on the body.

In carrying out the invention, a vertical leg 25 is attached to and depends from that side of the body 20 which faces the blade 13, the leg being attached to the trailing end of the body by screws 26. The leg 25 is located laterally between the blade 13 and the rail 14. When the body 20 is pushed along the rail 14, the lower portion of the leading edge of the leg 25 engages the trailing edge of the board 15 as indicated at 30 in FIGS. 1 and 3 and pushes the board into and past the blade 13 so as to avoid the need for the operator to place his fingers in proximity to the blade.

Preferably, an identical leg 31 (FIGS. 1 and 5) is attached to and depends from the trailing end portion of the body 20. The two legs 25 and 31 closely straddle the rip rail 14 and captivate the attachment 10 laterally on the rail so as to cause the attachment to move along a straight line during the active pushing or cutting stroke.

Further in keeping with the invention, an arm 33 (FIGS. 1 to 4) is pivotally mounted on the leading end portion of the body 20 and is biased downwardly into pressing engagement with the board 15. The arm thus holds the board downwardly against the table 12 to prevent the board from flying upwardly but, at the same time, the arm may float upwardly and downwardly to accommodate boards of different thicknesses.

Figure 4:
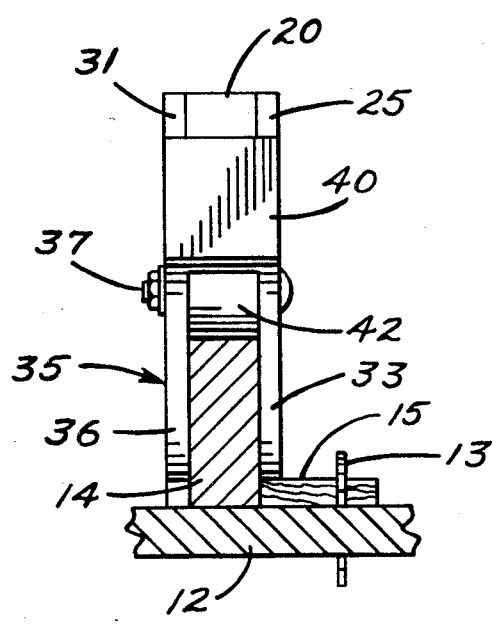
FIGS. 4 and 5 are fragmentary cross-sections taken substantially along the line 5—5 of FIG. 3.

Herein, the arm 33 is located in line with the leg 25 and forms part of a generally U-shaped member 35 having a second arm 36 (FIGS. 1 and 4). A horizontal pivot pin 37 extends through the arms 33 and 36 and the body 20 to mount the U-shaped member 35 for up and down swinging on the body. Like the legs 25 and 31, the arms 33 and 36 closely straddle the rip rail 14 and serve to stabilize the attachment 10 laterally on the rail (see FIG. 4).

The U-shaped member 36 also includes a cross-piece 40 (FIGS. 1 and 2) which extends across the leading end of the body 20 and connects the leading end portions of the arms 33 and 36. A coil spring 41 (FIG. 2) is compressed between the cross piece 40 and a projection 42 which extends from the body 20 adjacent the lower end thereof. Suitable fasteners 43 and 44 secure the ends of the spring to the cross piece 40 and the projection 42, respectively.

Figure 2:
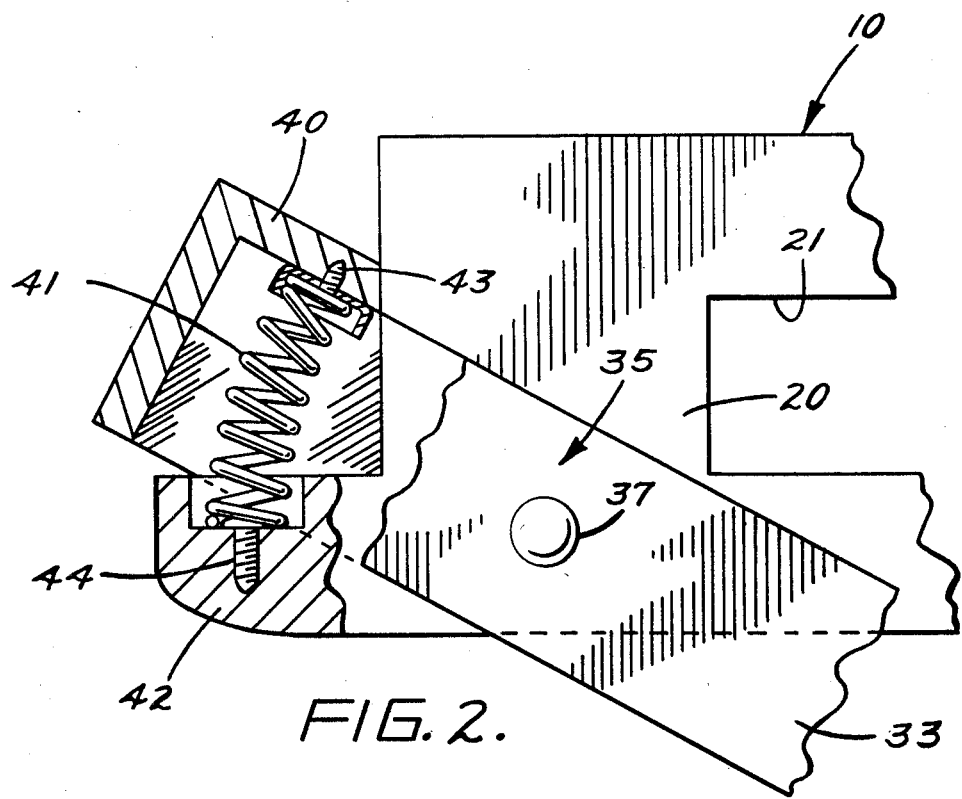
FIG. 2 is an enlarged side elevation of a portion of the attachment illustrated in FIG. 1 with certain parts being broken away and shown in section.

With the foregoing arrangement, the spring 41 biases the U-shaped member 35 clockwise about the pivot pin 37 so as to press the lower end of the arm 33 downwardly against the upper side of the board 15. The board thus is held downwardly on the table 12 and is prevented from being shot upwardly by the force of the rotating blade 13. If the board is thicker than the board 15 which has been shown, the arm 33 simply pivots counterclockwise to accommodate the thicker board. Conversely, the arm may swing clockwise to press downwardly against a thinner board. Clockwise swinging of the lower end of the arm beyond the lower end of the leg 25 is prevented by virtue of the cross piece 40 engaging the leading end of the body 20 as shown in FIG. 2.

From the foregoing, it will be apparent that the safety attachment 10 of the present invention is very simple in construction. The attachment may be simply placed downwardly on and lifted upwardly from the table 12 and the rail 14. The leg 25 moves the board 15 past the blade 13 with a positive pushing action while the arm 33 presses the board downwardly against the table and floats to accommodate thicker or thinner boards.

In the drawings, the attachment 10 and the rip rail 14 have been illustrated for use by a right-handed operator. It will be appreciated that the same attachment may be used by a left-handed operator when the rip rail is moved to the left side of the blade 13. In such an instance, the lower end portion of the leg 31 pushes the board 15 past the blade while the arm 36 holds the board downwardly against the table 12.

I claim:

1. An attachment for a table saw having a horizontal table, a blade rotational in a vertical plane and extending upwardly from the table, and a rip rail upstanding from the table and spaced laterally from the blade to guide a piece of stock into and past the blade as the stock is cut by the blade, said attachment comprising a body captivated laterally on the rip rail and adapted to be moved from the front of the rail toward the rear thereof during an active pushing stroke, a leg fixed rigidly to and depending from the trailing end portion of said body and located at a lateral position between said rail and said blade, the leading side of said leg engaging the trailing end of said stock and pushing said stock into said blade during said pushing stroke, an arm formed separately of said leg and pivotally connected to said body to swing upwardly and downwardly independently of said leg, and means for biasing said arm downwardly to cause the lower end of said arm to press downwardly against the upper side of said stock and to hold said stock downwardly on said table as said stock is pushed into and past said blade by said leg.

2. An attachment as defined in claim 1 further including a second leg fixed rigidly to and depending from the trailing end portion of said body and spaced laterally from said one leg, said legs closely straddling said rip rail to guide said body along said rail during said pushing stroke.

3. An attachment as defined in claim 2 in which said arm forms part of a U-shaped member having a second arm spaced laterally from said one arm, said arms closely straddling said rail to stabilize said body relative to said rail during said pushing stroke.

4. An attachment as defined in claim 3 in which the lower side of said body rests on the upper side of said rail.

5. An attachment for a table saw having a horizontal table, a blade rotatable in a vertical plane and extending upwardly from the table, and a rip rail upstanding from the table and spaced laterally from the blade to guide a piece of stock into and past the blade as the stock is cut by the blade, said attachment comprising a body adapted to rest slidably on top of the rip rail and adapted to be moved from the front of the rail toward the rear thereof during an active pushing stroke, a pair of laterally spaced legs fixed rigidly to and depending from the trailing end portion of said body and closely straddling said rail to guide said body along said rail during said pushing stroke, the leading side of the lower end portion of one of said legs being positioned to engage the trailing end of said stock at a lateral position between said rail and said blade and to push said stock into said blade during said pushing stroke, a generally U-shaped member formed separately of said legs and having laterally spaced arms, a horizontal pivot connecting said member to said body to enable said arms to swing upwardly and downwardly independently of said legs, said arms closely straddling said rail to stabilize said body relative to the rail during said pushing stroke, the lower end of one of said arms engaging the upper side of said stock at a lateral position between said rail and said blade, and resiliently yieldable means for biasing said arms downwardly about said pivot to cause the lower end of said one arm to press downwardly against said stock and to hold said stock downwardly on said table as said stock is pushed into and past said blade by said one leg.

6. An attachment as defined in claim 5 in which a laterally extending hand hole is formed through said body to facilitate gripping and pushing of said body.

7. An attachment as defined in claim 5 in which said U-shaped member includes a cross piece extending laterally of said body and connecting the leading end portions of said legs, a projection extending from the leading end of said body, said biasing means comprising a spring compressed between said cross piece and said projection.

8. An attachment as defined in claim 7 in which said cross piece is engageable with the leading end of said body to limit downward swinging of said arms beyond a predetermined position.

9. An attachment as defined in claim 1 in which said biasing means comprise a spring acting between said body and said arm.

* * * * *